United States Patent

[11] 3,581,044

[72] Inventors Daisaku Watari;
Tosio Morita, Kasuya-gun, Japan
[21] Appl. No. 769,545
[22] Filed Oct. 22, 1968
[45] Patented May 25, 1971
[73] Assignee Seibu Denki Kogyo Kabushiki Kaisha
Kasuya-gun, Japan
[32] Priority Nov. 2, 1967
[33] Japan
[31] 42/92847

[54] CONTINUOUSLY VARIABLE POWER SUPPLY FOR ELECTRIC DISCHARGE MACHINES CAPABLE OF MAINTAINING A CONSTANT RATIO BETWEEN AMPLITUDE AND DURATION OF DISCHARGE CURRENT
9 Claims, 5 Drawing Figs.

[52] U.S. Cl. .................................................. 219/69
[51] Int. Cl. .................................................. B23p 1/08
[50] Field of Search ................................... 219/69 (C), 69 (G), 69 (P), 69 (F)

[56] References Cited
UNITED STATES PATENTS
3,223,946 12/1965 Webb .......................... 219/69(P)UX
3,292,040 12/1966 Ullmann et al. ............... 219/69(P)X
3,435,176 3/1969 Lobur .......................... 219/69(G)

*Primary Examiner*—R. F. Staubly
*Attorney*—Hutchinson & Milans

ABSTRACT: Power supply means for applying continuously variable power across the spark electrode-to-workpiece circuit of an electric discharge machine. The spark electrode is connected in one branch of a multivibrator circuit, and control means are provided for continuously varying the amplitude of the current flowing through said branch while maintaining constant the ratio of the amplitude of this current flow to the duration of said flow. The control means comprises a variable resistor the ends of which are connected across the corresponding ends of the two branch circuits of the multivibrator circuit with the sliding piece connected to one terminal of the voltage source.

PATENTED MAY 25 1971  3,581,044

Inventors
DAISAKU WATARI
TOSIO MORITA

By Hutchinson & Milans
Attorneys

CONTINUOUSLY VARIABLE POWER SUPPLY FOR ELECTRIC DISCHARGE MACHINES CAPABLE OF MAINTAINING A CONSTANT RATIO BETWEEN AMPLITUDE AND DURATION OF DISCHARGE CURRENT

In the prior art practices in the field of electric discharge machine, attempts have been made to maintain a given relationship between the amplitude and duration of the discharge current pulses for a given tool electrode and workpiece structure, whereby minimum electrode wear is obtained. In general, the prior systems have proposed to vary the speed of machining of the workpiece by dividing the amplitude of the current discharge into stages or steps, so that a suitable duration of discharge current may be adopted for each of the stages, thereby assuring minimum wear rate of the electrode throughout the whole process from coarse machining to fine finishing. Accordingly, the pulse energy meeting the conditions of working speed, finished degree of surface, and clearance or interface area of tool electrode relative to the workpiece can be selected only in a stepwise manner. For example, suppose the finished degree of machined surface of a workpiece is required to be less than 10 $\mu$H max. Then, if the step next to 5 $\mu$H max. is 15 $\mu$H max., the speed of machining must be sacrificed in favor of 5 $\mu$H max., which proves often disadvantageous for the work efficiency.

Meanwhile, in the case of using a single electrode and working from coarse machining to fine finishing with successively lowered stages, particularly in the range of fine finishing at low pulse energy, the difference in performance between adjacent stages has an extremely great influence on the work efficiency. The same thing may be said about the case of a fine adjustment being required of the clearance in midmachining, or there being no stage that matches the interface area, which affects the wear rate of the tool electrode relative to the workpiece. These drawbacks may be eliminated by appropriately increasing the number of machining stages, but even this would not be able to eliminate the other drawbacks of the apparatus, such as high rate of failures and high production cost.

Accordingly, the primary object of the present invention is to provide an improved electric discharge machine characterized by the provision of control means for continuously varying the amplitude of the discharge current while maintaining constant the ratio between the amplitude and duration of the said discharge current.

In accordance with a more specific object of the invention, the spark electrode-to-workpiece circuit is connected in series in one branch of a multivibrator circuit, and the control means comprises a variable resistor that connects the branches at one end with the voltage source. More particularly, the ends of the variable resistor are connected between the ends of the branches, and the sliding piece of the variable resistor is connected with the source, whereby movement of the sliding piece introduces resistance into one branch while removing resistance from the other to continuously vary the amplitude of the discharge current.

Other objects and advantages of the invention will become apparent from a study of the following specification when considered in the light of the accompanying drawing, in which.

Figure 1:
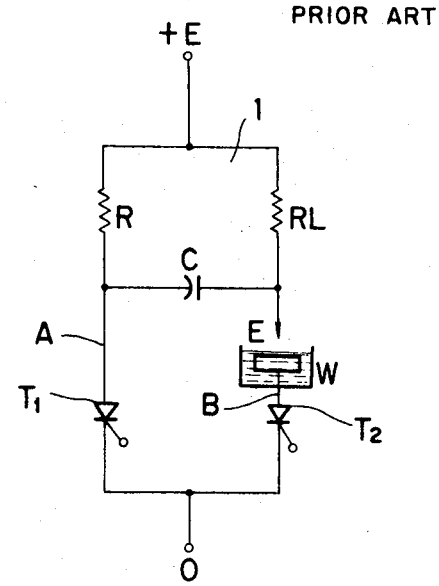
FIG. 1 is an electrical schematic diagram of a conventional power supply for an electric discharge machine.

Referring first to the known prior arrangement of FIG. 1, the spark electrode to workpiece circuit (E, W) is connected in series in one branch (B) with the load resistor RL and the switching element $T_2$, the other branch (A) including a load resistor R and a first switching element $T_1$. The ends of the branches are connected with the terminals of the source (+E). A fixed inverting capacitor C is connected at one end between resistor R and switching element $T_1$, and at the other end between resistor RL and electrode E. Should it be desired to vary the electrode discharge current, it would be necessary to substitute for each step or stage different load resistors R and RL, and a correspondingly different inverting capacitor C.

The present invention relates to an improved power supply system for an electric discharge machine affording a continuously variable removal rate, said power supply system being characterized by connecting the +E side of the branch circuit A to one end terminal 2 of the variable resistor VR, and the +E side of the discharge circuit B to the other variable resistor terminal 3, respectively, while at the same time connecting the sliding piece N of the variable resistor VR to the +E terminal of DC voltage source. The minus sides of the semiconductor switching elements $T_1$, $T_2$ are connected jointly to the 0 terminal of DC voltage source. The multivibrator 1 comprises the branch circuit A having a load resistor R and a semiconductor switching element $T_1$ connected with the discharge circuit B having a load resistor RL, a tool electrode E, a workpiece W and a semiconductor switching element $T_2$, the minus sides of said load resistors R, RL being connected, respectively, to the terminals of the inverting capacitor C. In this case, it is possible to interchange the connections between +E and O. For the semiconductor switching elements $T_1$ and $T_2$, transistors or thyristors—such as a reverse blocking triode thyristor, turnoff thyristor, bidirectional diode thyristor, bidirectional triode thyristor—may be employed. The electric discharge machining is chiefly done in a liquid.

Figure 2:
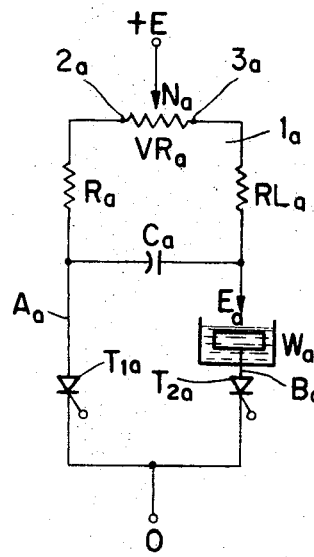
FIG. 2 is a schematic diagram of a first embodiment of the invention including a reverse blocking triode thyristor or a turnoff thyristor as the switching element in the branch containing the spark electrode-to-workpiece circuit.
Figure 3:
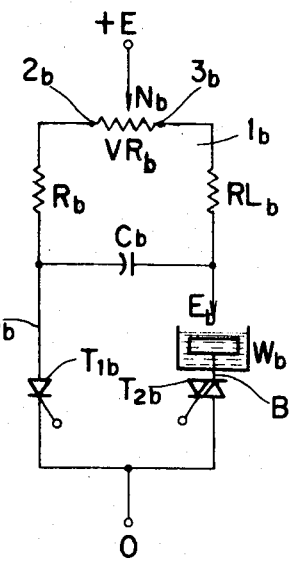
FIGS. 3 and 4 are modifications of the embodiment of FIG. 2 including as the aforesaid switching element a bidirectional triode thyristor and a bidirectional diode thyristor, respectively.
Figure 4:
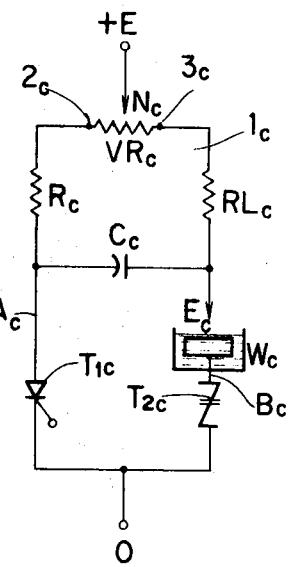

The semiconductor switching element $T_{2a}$ in FIG. 2 is a reverse blocking triode thyristor or a turnoff thyristor; the element $T_{2b}$ in FIG. 3 is a bidirectional triode thyristor; and the element $T_{2c}$ in FIG. 4 is a bidirectional diode thyristor.

When, in FIGS. 2—4, the sliding piece N of the variable resistor VR is shifted to the side of the fixed terminal 3 and the semiconductor switching element $T_2$ is fired, under the action of the multivibrator 1 the discharge current for machining flows from terminal +E to terminal O via resistor RL, electrode E, workpiece W and switching element $T_2$, while at the same time as the start of discharge, a charging of the inverting capacitor C at a time constant of (VR+R)×C begins from +E through the variable resistor VR and the load resistor R. If, these resistors and capacitor are, respectively, 10 ohms for VR, 3 ohms for RL, 15 ohms for R and 5 microfarads for C, the time constant will be $(10+15) \times 5 \times 10^{-6}$ sec. Therefore, if the semiconductor switching element $T_1$ is fired just when the potential between the terminals of the capacitor C becomes nearly equal to the power supply voltage, the firing from said switching element $T_2$ will extinguish, ending the discharge, because the accumulated load of the capacitor C is imposed with reverse polarity on said element. At the same time, the capacitor C will begin to be charged at a time constant of RL×C ($3 \times 5 \times 10^{-6}$ sec.) from +E through the load resistor RL. When the switching element $T_2$ is fired at the moment of the potential between the terminals of the capacitor C becomes nearly equal to the power supply voltage, a discharge current will flow between E and W as mentioned above and the workpiece W will be progressively machined under repetition of the above sequence. In this case, since the series resistance of the discharge circuit B from +E to O with the sliding piece N of the variable resistor VR located on the side of the fixed terminal 3 is a minimum, the amplitude of the discharge current will be maximum, and since the series resistance of the bypass circuit A from +E to O (i.e., the charging resistance of the inverting capacitor C) is a maximum, the duration of the discharge current will be maximum. Next, when the sliding piece N is shifted and fixed to the side of the fixed terminal 2 of the variable resistor VR and in this condition the semiconductor switching element $T_2$ is fired, under the action of the multivibrator a discharge current for machining will flow from terminal +E to terminal O via variable resistor VR, resistor RL, electrode E, workpiece W and switching element $T_2$. At the same time, the inverting capacitor C will begin to be charged from +E through R at a time constant of R×C. According to the above-mentioned numerical examples, the value of this time constant will be equal to $15 \times 5 \times 10^{16}$ sec. Therefore, if the semiconductor switching element $T_1$ is fired at the moment the potential between the terminals of the capacitor C attains approximately the power supply voltage, the semiconductor element $T_2$, being impressed with the accumulated load of the capacitor C with reverse polarity, will cease to fire, ending the discharge. Meanwhile, a charging of the capacitor C at a time constant of $(VR+RL) \times C[(10+3) \times 5 \times 10^1$ sec.] will be started in the direction of +E to resistor RL via variable resistor VR, and when $T_2$ is fired at the moment of the potential between the terminals of the capacitor C having reached approximately the power supply voltage, a discharge current as mentioned above will flow between tool electrode E and workpiece W, thereby repeating the same process and progressively machining the workpiece W. In this case, since the series resistance of the discharge circuit B from +E to O is maximum, the amplitude of the discharge current will be minimum, and since the series resistance of the bypass circuit A from +E to O is minimum, the duration of the discharge current will be minimum. Namely, 3 the sliding piece N is set to the fixed terminal of the variable resistor VR, both the amplitude and duration of the discharge current will be maximum and when said sliding piece N is set to the fixed terminal 2, both will be minimum.

Thus, in the first embodiment of this invention as illustrated in FIGS. 2—4, at whatever position the sliding piece N may be set, the ratio between amplitude and duration of discharge current can be maintained approximately constant, thereby assuring the minimum wear of electrode.

Though the variable range of removal rate is subjected to a certain extent of restriction due to the fixed capacity of the inverting capacitor, the experimental results show that it would be easy to make the ratio between maximum and minimum of machining equal to 10:1. Accordingly, the machining stages under the conventional power supply to electric discharge machining of 1 g/min. maximum should usually be eight (i.e., 1, 0.64, 0.32, 0.16, 0.08, 0.04, 0.02 and 0.01 g./min.). However, if a stepless speed change device according to this invention, were to be adopted, the machining stages from 1 g./min. to 0.01 g./min. will be continuously realized through a switching between one stage of 1—0.08 g/min. and another stage of 0.1—0.01 g./min.

Figure 5:
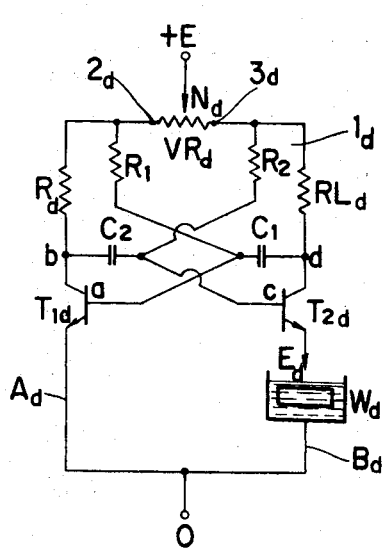
FIG. 5 is a second embodiment of the invention including transistor switching element and cross-coupled resistor and inverting capacitor means.

In FIG. 5 illustrating the second embodiment of this invention, the sliding piece $N_d$ is set to the fixed terminal 3 of the variable resistor $VR_d$ and in this condition the voltage +E is imposed.

First, suppose the semiconductor switching element $T_{2d}$ is in a conductive condition and the semiconductor switching element $T_{1d}$ is in a nonconductive condition. Then a discharge current will flow from source terminal +E to terminal O via resistor $RL_d$, switching element $T_{2d}$, electrode $E_d$ and workpiece $W_d$. Thereby, the potential at the point $b$ is nearly +E, while the potential at the point $a$ is negative on account of the accumulated load of $C_1$, thus reverse-biasing the base of the semiconductor switching element $T_{1d}$. As the potential at point $a$ rises from negative through zero to +E at a time constant of $(VR_d+R_1) \times C_1$, said potential at $a$ reaches zero, the semiconductor switching element $T_{1d}$ will begin to pass the current. When said potential at $a$ rises further, said element $T_{1d}$ will pass more current. Thereupon, the collector current of said element $T_{1d}$ will power the potential at $b$ and the voltage change thereby produces reverse bias on the base of the semiconductor switching element $T_{2d}$ rendering the semiconductor switching element $T_{2d}$ nonconductive. As the result of becoming nonconductive, the semiconductor switching element $T_{2d}$ will have the collector current reduced and this in turn will make the potential at $d$ sharply rise toward +E. Meanwhile, the potential at $c$ will rise from negative through zero toward +E at a time constant of $R_2 \times C_2$. When the zero potential is reached, the semiconductor switching element $T_{2d}$ begins to pass the current, and when the potential at $c$ further rises, said element $T_{2d}$ will become more conductive, causing a flow of discharge current between $E_d$ and $W_d$ and repeating the same process as mentioned above. In this manner, the semiconductor switching elements $T_{1d}$ and $T_{2d}$ alternately become conductive and nonconductive and the repetition of this alternation causes an intermittent discharge. Since the series resistance of the discharge circuit $B_d$ from +E to O is minimum, the amplitude of the discharge current will be maximum; and since the charging resistance $(VR_d+R_1)$ of $C_1$ is maximum, the duration of discharge current will be maximum.

Next, the sliding piece $N_d$ is reset to the fixed terminal $2_d$ of the variable resistor $VR_d$ and the voltage +E is imposed. At first, with $T_{2d}$ conductive and $T_{1d}$ nonconductive, the discharge between source terminals +E to O takes place via variable resistor $VR_d$, resistor $RL_d$, switching element $T_{2d}$, electrode $E_d$ and workpiece $W_d$. At this moment, the potential at $b$ is nearly +E and the potential at $a$ is negative on account of the accumulated load of the capacitor $C_1$ whereby the base of the element $T_{1d}$ is reverse biased.

When in the course of the potential at $a$ rising from negative through zero toward +E at a time constant of $R_1 \times C_1$, the potential at $a$ reaches zero, the element $T_{1d}$ begins to be conductive, and with a further rise in the potential at $a$, the element $T_{1d}$ becomes more conductive. Thereupon, the potential at $b$ will drop on account of the collector current in said element $T_{1d}$ and the voltage change thereby will cause a reverse biasing of the base of the element $T_{2d}$, resulting in said element $T_{2d}$ beginning to be nonconductive. As the result of becoming nonconductive, the collector current in this element $T_{2d}$ will diminish and in consequence the potential at $d$ will sharply rise toward +E. Meanwhile, the potential at $c$ will rise from negative through zero toward +E at a time constant of $(VR_d+R_2) \times C_2$. When this potential reaches zero, the element $T_{2d}$ will begin to be conductive and with a further rise in the potential at $c$, it will become more conductive, thereby causing a discharge current flow between $E_d$ and $W_d$ and repeating the same process as above.

In this manner, the alternate conduction and nonconduction of $T_{1d}$ and $T_{2d}$ result in an intermittent discharge. In this case, since the series resistance of the discharge circuit $B_d$ from +E to O is maximum, the amplitude of discharge current will be minimum; and since the charging resistance $R_1$ to the capacitor $C_1$ is minimum, the duration of discharge will be minimum. At any position of the sliding piece $N_d$, the change ratio between amplitude and duration will remain nearly the same, thereby assuring the minimum wear rate of electrode.

The effect of the second embodiment is the same as that of the first embodiment.

While in accordance with the provisions of the Patent Statutes, the preferred form and embodiments of the invention have been illustrated and described, it will be apparent to those skilled in the art that various modifications may be made without deviating from the invention set forth in the following claims.

We claim:

1. Power supply means for applying continuously variable power across the spark electrode-to-workpiece circuit of an electric discharge machine, comprising a source of direct-current voltage (+E);

first branch circuit means including, in series, a first load resistor (R) and a first semiconductor switching means ($T_1$);

second branch circuit means including, in series with the said spark electrode-to-workpiece circuit, a second load resistor (RL) and a second semiconductor switching means ($T_2$);

means connecting said branches with said source to define a multivibrator circuit, said connecting means including inverting capacitor means (C) connected between intermediate portions of said branches, whereby said branches are alternately conductive and nonconductive, respectively;

and control means for varying the amplitude of current flow through said second branch while maintaining constant the ratio of the amplitude of current flow to the duration of said current flow in said second branch, whereby minimum electrode wear is achieved during the machining operation;

said control means comprising a variable resistor (VR) the ends of which are connected with corresponding ends of said first and second branch circuits, respectively, and said variable resistor including a sliding piece (N) connected with one terminal of said source.

2. Electric discharge machine as defined in claim 1, wherein said second switching means is connected between said spark electrode-to-workpiece circuit and the other terminal of said source, wherein said first resistor is connected between said first switching means and said variable resistor, wherein said second resistor is connected between said spark electrode-to-workpiece circuit and said variable resistor, and wherein said capacitor means are connected between the ends of said resistors remote from said variable resistor.

3. Electric discharge machine as defined in claim 2, wherein at least one of said switching means comprises a reverse blocking triode thyristor.

4. Electric discharge machine as defined in claim 2, wherein at least one of said switching means comprises a turnoff thyristor.

5. Electric discharge machine as defined in claim 2, wherein at least one of said switching means comprises a bidirectional diode thyristor.

6. Electric discharge machine as defined in claim 2, wherein at least one of said switching means comprises a bidirectional triode thyristor.

7. Electric discharge machine as defined in claim 1, wherein said second switching means is connected between the spark electrode-to-workpiece circuit and said second load resistor.

8. Electric discharge machine as defined in claim 7, and further wherein said switching means comprises transistors having emitter to collector circuits connected in series in said branches, respectively, said inverting capacitor means being cross-coupled between the bases and collectors of said transistors, respectively.

9. Electric discharge machine as defined in claim 8, and further including a pair of biasing resistors for cross-connecting said capacitors with opposite ends of said variable resistor, respectively.